United States Patent [19]
Cullen

[11] Patent Number: 5,297,678
[45] Date of Patent: Mar. 29, 1994

[54] FILM CASSETTE

[75] Inventor: Allen B. Cullen, Churchville, N.Y.

[73] Assignee: Eastman Kodak Company, Rochester, N.Y.

[21] Appl. No.: 68,813

[22] Filed: May 28, 1993

[51] Int. Cl.⁵ ............................................. B65D 81/30
[52] U.S. Cl. .................................... 206/455; 206/523; 206/524.3
[58] Field of Search ............... 206/454, 455, 456, 523, 206/524.3, 594; 354/275; 378/182

[56] References Cited

U.S. PATENT DOCUMENTS

| | | | |
|---|---|---|---|
| 2,878,389 | 3/1959 | Raffman | 250/68 |
| 3,511,990 | 5/1970 | Hauss | 206/455 X |
| 4,467,919 | 8/1984 | Bengtsson et al. | 206/455 |
| 4,538,294 | 8/1985 | Tamura et al. | 378/187 |
| 4,681,227 | 7/1987 | Tamura et al. | 206/523 X |
| 4,754,880 | 7/1988 | Tehrani | 206/523 |
| 5,025,465 | 6/1991 | Bauer et al. | 378/169 |
| 5,077,778 | 12/1991 | Fabian | 378/162 |
| 5,086,446 | 2/1992 | Bauer et al. | 378/188 |

FOREIGN PATENT DOCUMENTS

0499872A1  2/1992  European Pat. Off. .
2057628A   6/1980  United Kingdom .

Primary Examiner—Paul T. Sewell
Assistant Examiner—Jacob K. Ackun, Jr.
Attorney, Agent, or Firm—Dana M. Schmidt

[57] ABSTRACT

A cassette is provided having a base and a cover which is hinged to the base for closing the same and providing a light-tight space therebetween. A latching assembly is provided for latching and unlatching of the top of the base. A cushion member is secured in to the inside surface of the cover and an intensifying screen is secured to the outer surface of the cushion member. The cushion member comprises a first layer which is secured to the inner surface of the top cover an a second outer layer. The first layer is provided with a a cut-out portion for receiving the latch assembly. The second layer is superimposed on the first layer and covers the cut-out portion which receives said latch assembly. The first layer is made of a material having a first density and the second layer is made of a material having a second density greater than the first density such that a substantially uniform pressure is applied against the film placed in the space between top cover and base.

32 Claims, 11 Drawing Sheets

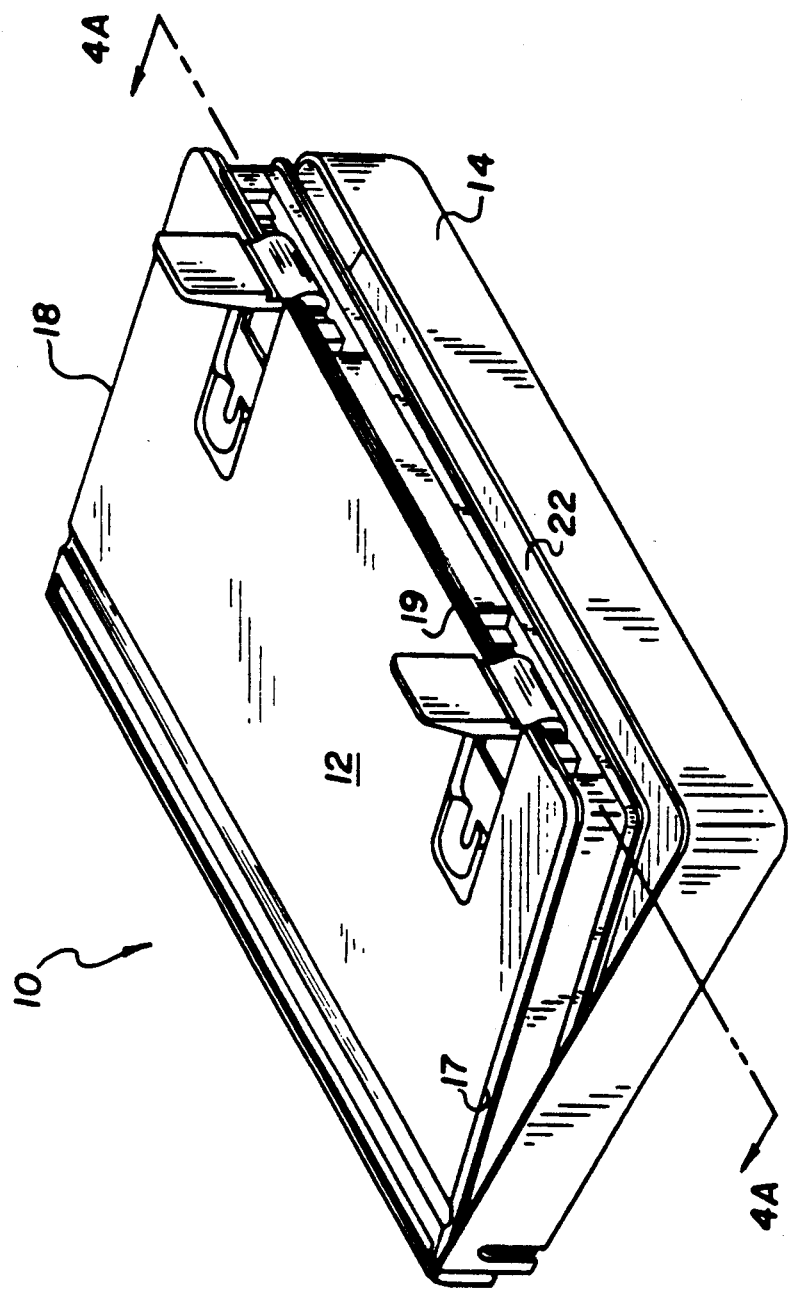

FIG. 7A
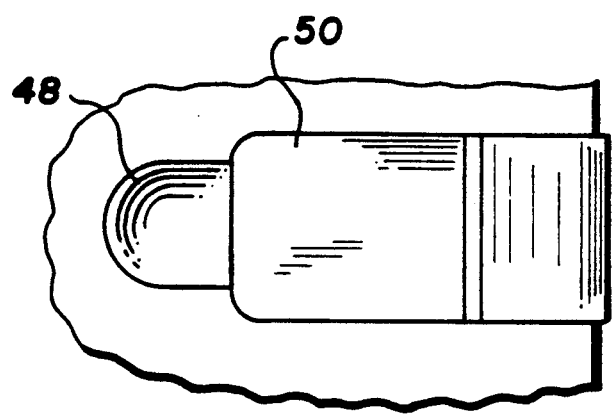
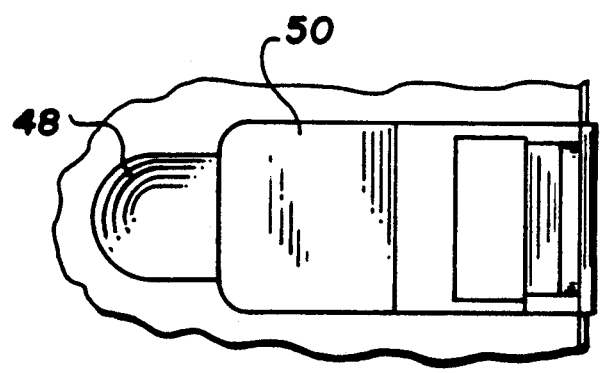
FIG. 7B

FILM CASSETTE

FIELD OF THE INVENTION

The present invention relates to a cassette for holding a photosensitive material, and more particularly, to a cassette that is particularly suited for holding x-ray film designed for use in mammography.

BACKGROUND OF THE INVENTION

Typical prior art film cassettes comprise a cover which is hingedly mounted to a base such that when the cover is closed on the base, there is provided a light-tight space therebetween for receiving photosensitive x-ray film. Secured to the inside surface of the cover is a foam pad having an intensifying screen secured to its outer surface. When the cover is in the closed position, the foam pad and intensifying screen pushes the x-ray film firmly against the base of the cassette. Appropriate latching means are provided for latching and unlatching the cover with respect to the base. With cassettes that are designed for use in mammography it is important that the film be placed closely adjacent the edge of the cassette that is placed against the patient and that the best possible image be obtained along the edge as well as in the central area of the film.

A problem experienced with prior art cassettes is that there is a lack of good film contact between the intensifying screen and the adjacent a-ray film, especially along the edges of the film. Foam pads used in prior art cassettes typically comprise a single layer of a resilient material. The foam pad generally provides relatively little force at the edge areas of the film as opposed to the areas distal from the edges. Additionally, the latching mechanism is often provided adjacent the edge of the cassette to be placed against the patient. The foam pad and attached intensifying screen is simply placed directly over the latching mechanism which further contributes to inconsistent uniform contact between the intensifying screen and film in this area.

Applicant has invented an improved cassette which minimizes or eliminates many of the problems of the prior art and also provides a cassette that is easy and economical to manufacture.

SUMMARY OF THE INVENTION

In accordance with the present invention, a cassette is provided having a base and a cover which is hinged to the base for closing the same and providing a light-tight space therebetween. A latching assembly is provided for latching and unlatching of the top to the base. A cushion member is secured in to the inside surface of the cover and an intensifying screen is secured to the outer surface of the cushion member. The cushion member comprises a first layer which is secured to the inner surface of the top cover and a second outer layer. The first layer is provided with a a cut-out portion for receiving the latch assembly. The second layer is superimposed on the first layer and covers the cut-out portion which receives the latch assembly. The first layer is made of a material having a first load deflection value and the second layer is made of a material having a second load deflection value greater than the first density such that a substantially uniform pressure is applied against the film placed in the space between top cover and base.

The invention and its objects and further advantages will become more apparent in the detailed description of the preferred embodiment, presented below.

BRIEF DESCRIPTION OF THE DRAWINGS

In the detailed description of the preferred embodiment of the invention presented below, reference is made to the accompanied drawings, in which:

FIG. 2 is a perspective view of the cassette of FIG. 1 illustrating the cassette in the open position;

FIG. 7A is a top plan view of a portion of the cassette of FIG. 6A as taken along line 7A—7A illustrating the latch assembly in the closed position;

FIG. 7B is a top plan view of a portion of the cassette of FIG. 6B as taken along line 7B—7B illustrating the latch assembly in the unlatched position;

DETAILED DESCRIPTION

Figure 1A:
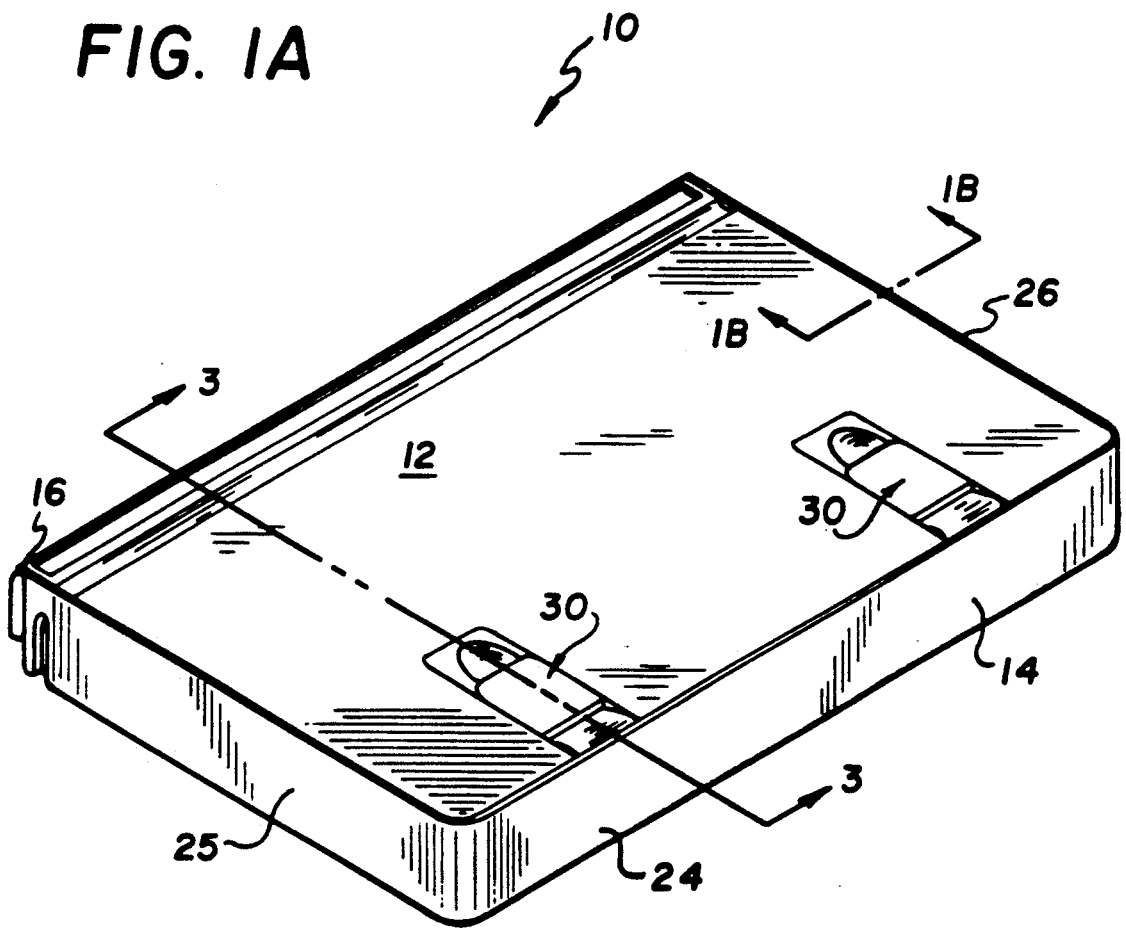
FIG. 1A is a perspective view of a cassette made in accordance with the present invention in the closed position.

Referring initially to FIGS. 1-4, a cassette made in accordance with the invention is generally designated 10 and comprises an upper cassette portion 12 (cover) and a lower cassette portion 14 (base). The upper and lower cassette portions are secured together at a common edge by a hinge 16 so as to allow the upper cassette portion 12 to be rotated with respect to lower cassette portion 14.

Upper portion 12 of cassette 10 comprises a generally planar rectangular panel made, for example, of a plastic material. In the particular embodiment illustrated, the upper cassette portion 12 is made of a standard ABS material (acrylonitrile-butadiene-styrene polymer). Upper cassette portion 12 comprises a pair of side edges 17,18, a front edge 19 and a rear edge 20 which is secured to hinge 16. A sealing rib 21 extends continuously along edges 17,18,19.

Lower cassette portion 14 comprises a generally rectangular bottom wall 22 having a continuous outer peripheral wall which comprises a front wall portion 24, a pair of side wall portions 25,26 and rear wall portion 28.

Figure 1B:
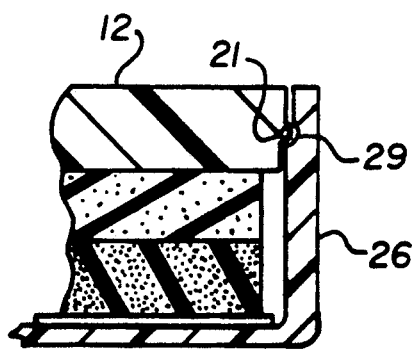
FIG. 1B is an enlarged partial cross-sectional view of the cassette of FIG. 1 as taken along line 1B—1B.
Figure 3:
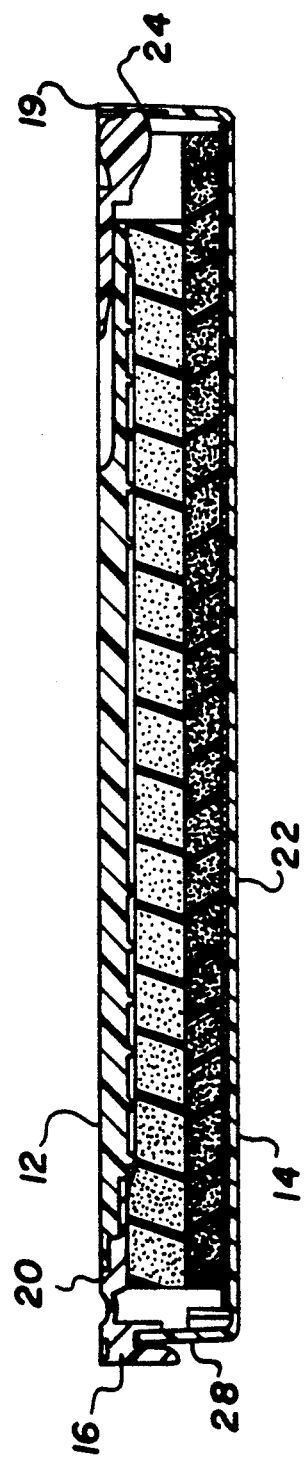
FIG. 3 is cross-sectional view of the cassette of FIG. 1 as taken along line 3—3.
Figure 4A:
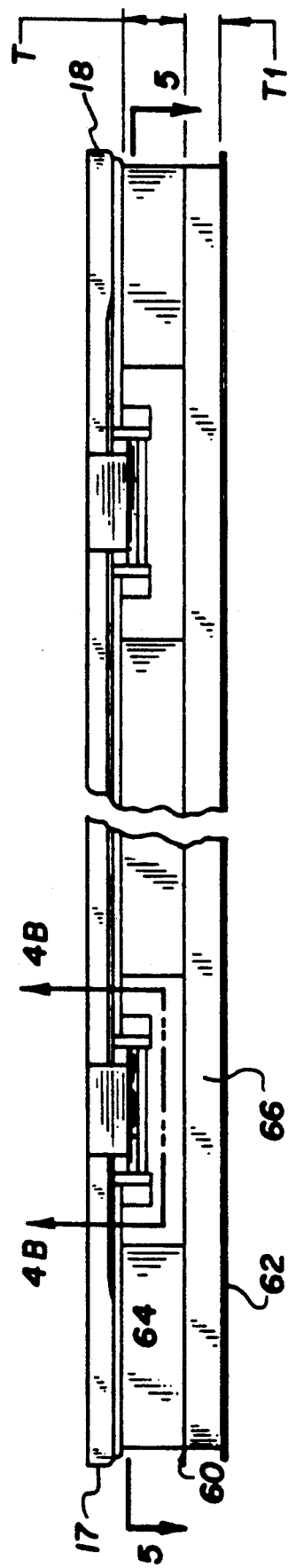
FIG. 4A is a side elevational view of the cover of the cassette of FIG. 2 as taken along line 4A—4A.
Figure 4B:
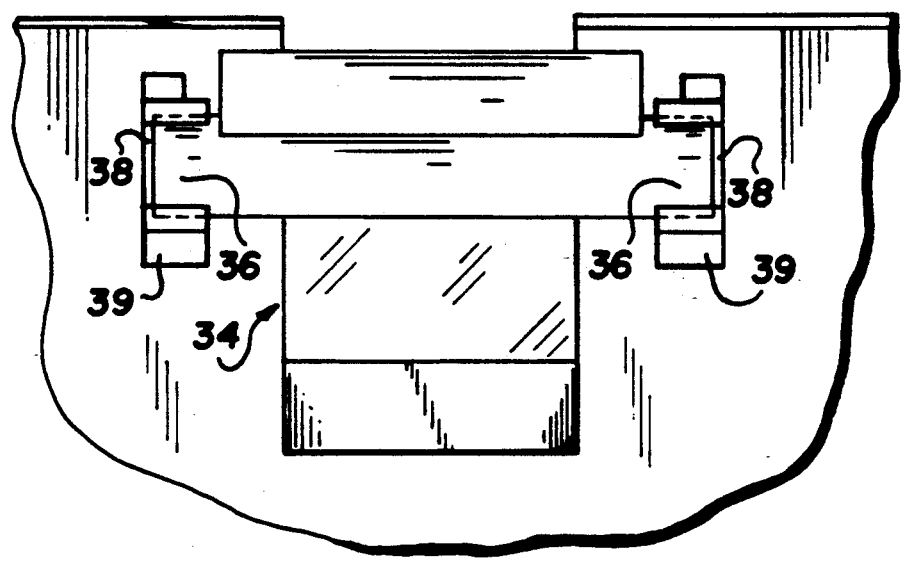
FIG. 4B is an enlarged partial front view of the cassette as taken along line 4B—4B of FIG. 4A.

A continuous groove 29 is provided in wall portions 24,25,26 which mate with sealing rib 21 on edges 17,18,19 so as to produce a light tight seal (see FIG. 1B). As illustrated, lower cassette portion is integrally formed as a single unit and is preferably made of a plastic material. In particular, the lower cassette portion 14 is also made of a standard ABS material (acrylonitrile-butadiene-styrene polymer). The rear wall 28 is also secured to hinge 16 in any appropriate manner.

Figure 6A:
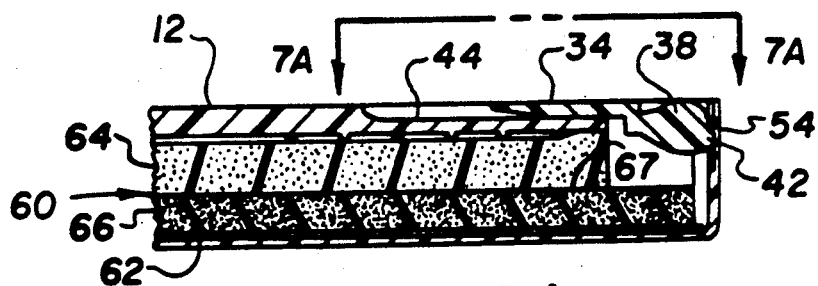
FIG. 6A is a partial enlarged cross-sectional view of a portion of the cassette of FIG. 3.
Figure 6B:
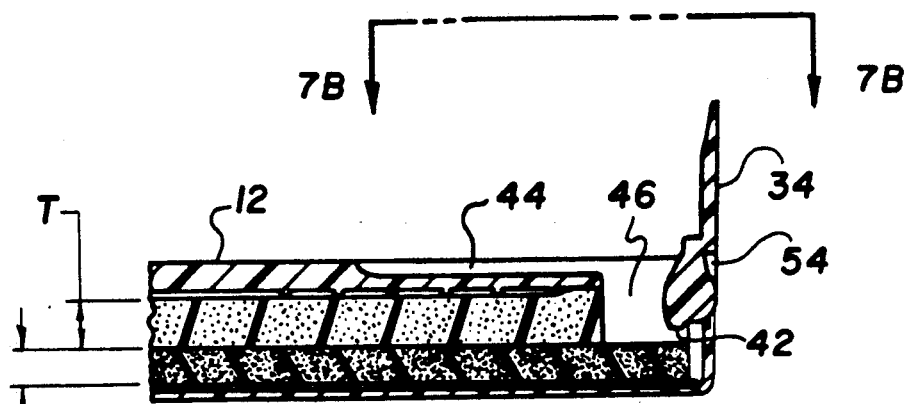
FIG. 6B is a view similar to FIG. 6A illustrating the latch assembly in the unlocked position.
Figure 6C:
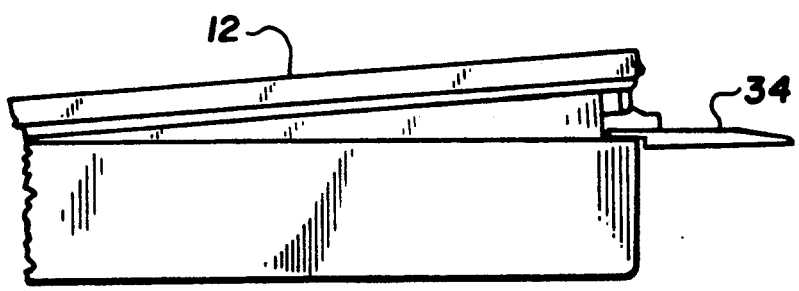
FIG. 6C is a partial side elevational view similar to FIG. 6B of the cassette illustrating the cassette in the open position.

A pair of latch assemblies 30 are provided for latching and unlatching the upper cassette portion 12 with respect to lower cassette portion 14 so as to provide a light-tight space therebetween. In the particular embodiment illustrated, two latch assemblies 30 are provided, however, cassette 10 may be provided with any desired number of latch assemblies. Referring to FIGS. 4, 6A-C and 7A-B, there is illustrated in greater detail one of the latch assemblies 30 provided, it being understood that the other latch assembly is identical in construction. In particular, latch assembly 30 includes a lever 34 which is rotatably mounted to the upper cassette portion 12 by a pair of pin sections 36 which extends into recesses 38 provided in spaced projections 39 which extend from the upper cassette portion 12. The upper cassette portion 12 is preferably designed such that the top of lever arm 34 is substantially flush with the top surface of the upper cassette portion 12. In this regard, the upper cassette portion 12 is provided with a recess portion 44 designed to receive the lever arm 34. The recess portion 44 is provided with an opening 46 for allowing rotation of the forward end 38 of the lever arm. Recess portion 44 preferably extends past the end of lever 34 as to allow the finger of a user to grasp the distal end 50 so that the lever arm can be rotated from the locked position, as illustrated in FIG. 6A, to the unlocked position, as illustrated in FIG. 6B. The forward end 38 is provided with a locking projection 42 which is designed to mate with a lip-retaining portion 54 provided in front wall portion 24 of lower cassette portion 14. It can be seen that when the lever arm is rotated from the position illustrated in FIG. 6B to that illustrated in FIG. 6A, this will cause the upper cassette portion to be secured to lower portion 14.

Figure 5:
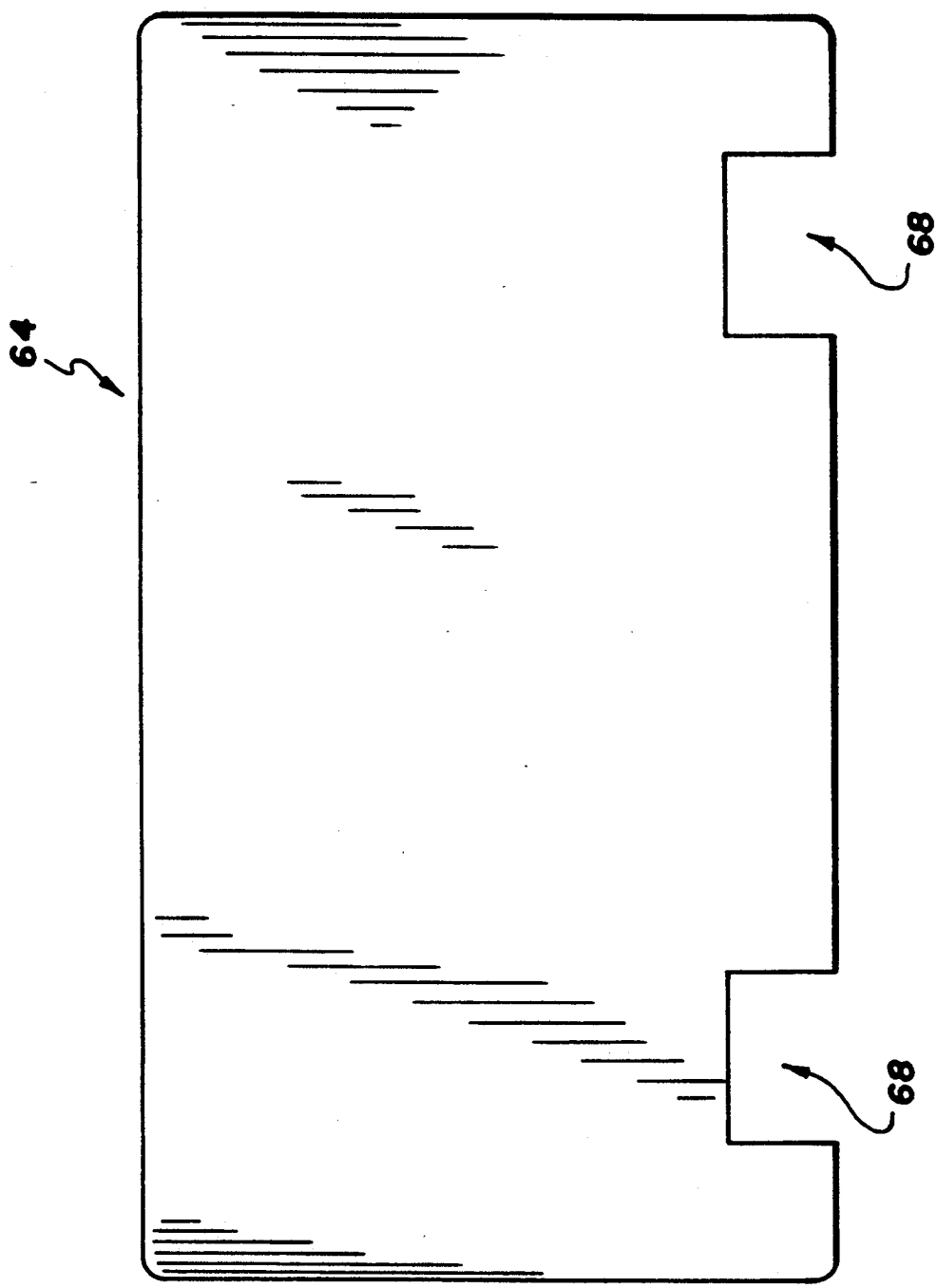
FIG. 5 is top plan view of the bottom layer of the cushion member as taken along line 5—5 of FIG. 4A.

The upper cassette portion 12 is provided with a cushion member 60 which is secured to the inner surface of cover 12 such that the cushion member 60 will be disposed between the upper and lower cassette portions 12,14. Secured to the upper surface of cushion member 60 is an intensifying screen 62. Cushion member 60 is designed such that when the cassette 10 is in the closed position, the intensifying screen 62 will be pressed against a photosensitive sheet of material (not shown) placed within the cassette, for example, a sheet of x-ray film. The cushion member 60 comprises a first inner layer 64 which is disposed adjacent the inner surface of upper cassette portion 34 and an outer layer 66 which is secured to the other side of the inner layer 64 secured to the upper cassette portion 54. The inner surface of outer layer 66 is disposed adjacent to inner layer 64 and its outer surface is secured to the intensifying screen 62. The inner layer 64 extends over substantially the entire inner surface of upper cassette portion 12 such that it is closely adjacent the side edges 17,18,19,20. The inner layer 64 is provided with a pair of cut-out portions 68 sized and shaped so as to receive each of the latch assemblies 30 as best seen by reference to FIG. 5. The inner layer 64 has a thickness T such that the top surface 67 is substantially equal to, or above, the upper most point of the latch assembly 30. In the particular embodiment illustrated, the thickness T of inner layer 64 is approximately 0.25 inches (0.635 cms). However, it is to be understood that the thickness T may be varied as desired to accommodate the appropriate adjacent latch assemblies.

The outer layer 66 is superimposed on inner layer 64 and extends over substantially the entire surface of upper cassette portion 12 such that the edges of the outer layer are also closely adjacent the edges 17,18,19,20. The outer layer 66 also extends over the cut-out portion 68. Thus, the outer layer 66 provides a continuous uniform layer over substantially the entire surface of the upper cassette portion. The outer layer 66 has a thickness T1 which in the particular embodiment illustrated, is approximately 0.375 inches (0.9525 cms). However, it is to be understood that the thickness T1 of outer layer 66 may be varied as desired.

The inner and outer layers are made of appropriate materials such that a substantially uniform pressure is applied against the film when the upper cassette portion is in the closed position with respect to lower cassette portion 14. The inner layer 64 is designed to provide a cushion support which is more flexible than the outer layer 66. In particular, the inner layer 64 is made of an open cell foam material having a density no greater than about 1.2 lbs/cubic foot, preferably in the range of 1.0 to 1.2 lbs/cubic foot. Additionally, the inner layer 64 has a load deflection value in the elastic buckling region of about 2 to 2.5 lbs. In the particular embodiment illustrated, the inner layer 64 is made out of open cell polyurethane material having a 2.5 lb load deflection value in the elastic buckling region. The foregoing values were determined in accordance with ASTM 3574 Tests A, C and D. A suitable foam may be purchased from Foamex of Arcada, N.Y., Part No. 561011.

The outer layer 66 is also made of a open cell foam material having a density and/or load deflection value greater than the density of the inner layer 64. In the particular embodiment illustrated, layer 66 has a density of about 3.0 lbs/cubic ft. Preferably, the outer layer has a load deflection value in the elastic buckling region of 7.0 to 8.0 lbs, preferably no greater than about 7.5 lbs. In the particular embodiment illustrated, the outer layer is made out of open cell polyurethane material and has a thickness T1 of about 0.25 inches. A suitable foam material may be purchased from Foamex, Part No. 1030. By properly designing the density of the inner and outer layers 64,66, a more uniform pressure may be provided across the entire surface, including the latch mechanism and along the edges of the cassette thereby minimizing anomalies that may be produced on the film as a result of the film not being pressed uniformly against the cassette. In cassette of the present invention the variation in pressure applied by the cushion member 60 against a film place within the cassette does not vary more than about 20%, preferably no greater than about 10%.

Figure 8:
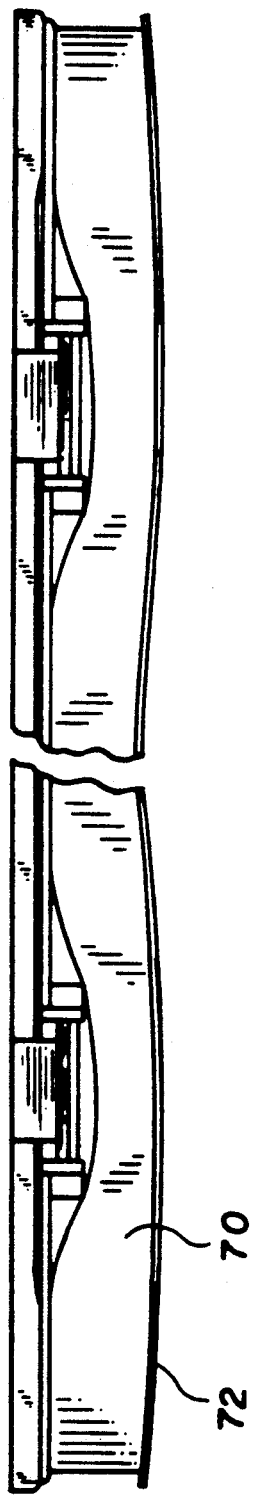
FIG. 8 is a side elevational view (similar to FIG. 4) of a cover of cassette made in accordance with the prior art.

Referring to FIG. 8 there is illustrated front elevational view of a cover made in accordance with the prior art. The cover of the cassette of the prior art illustrated in FIG. 8 discloses the use of a single cushion layer 70 instead of the dual cushion layer illustrated in the present invention. As can be seen, the single cushion layer 70 is initially deflected by the latch assembly. This results in substantial non-uniformity in pressure being applied to the film. In the manufacture of such cassettes in prior art, it is often necessary to rework the cassette in an attempt to provide the appropriate degree of stiffness and uniformity in this area. If the cassette can not be reworked, the intensifying screen 72 must frequently be scrapped. Intensifying screens are quite expensive and can, therefore, add to the overall cost of manufacturing of the cassettes that are acceptable.

Figure 9:
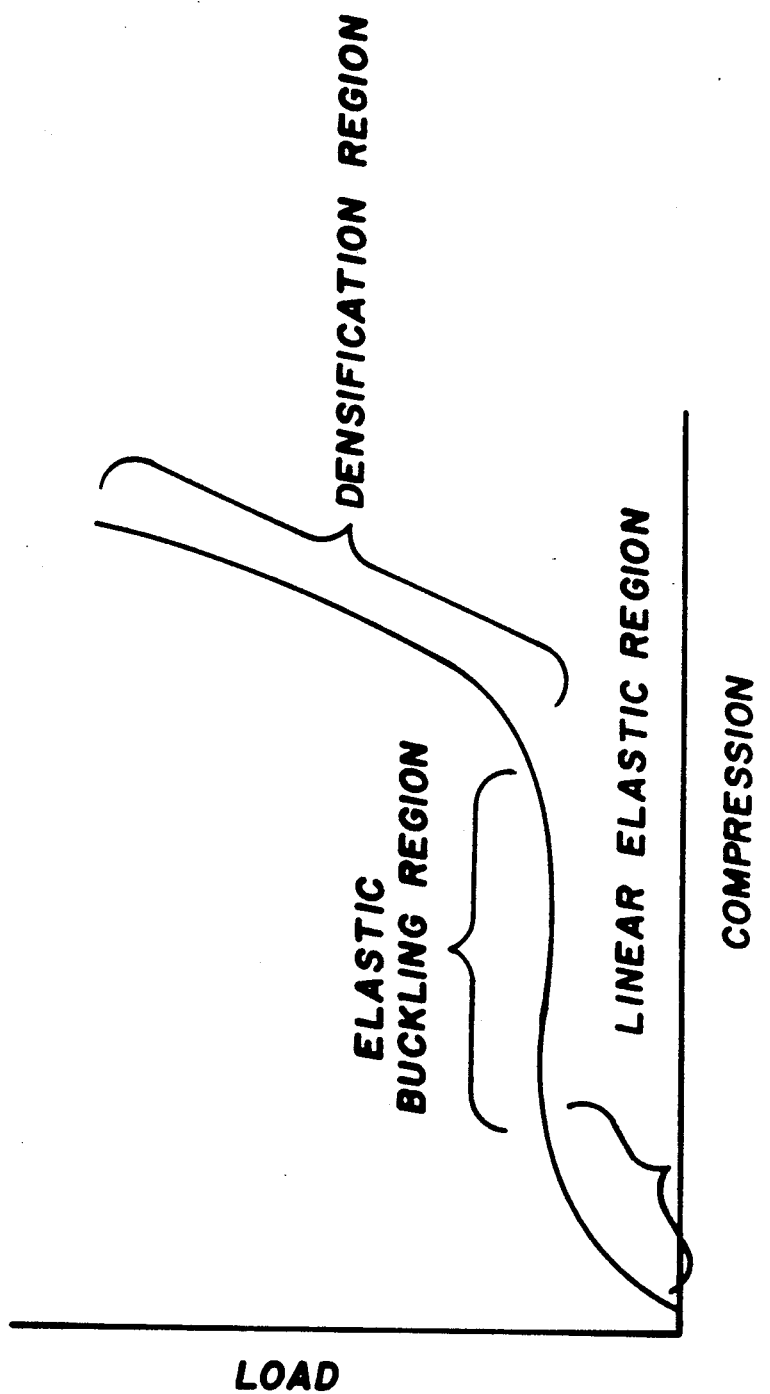
FIG. 9 is a load deflection curve for a typical foam layer.

Referring to FIG. 9, there is illustrated a typical load deflection curve for a single foam layer. As can be seen, the curve comprises three distinct sections as represented by the letters A, B and C. In section A, the foam layer acts in a generally linear elastic manner. In section B, continued deflection occurs without any substantial increase in load. This is due to the individual elements of the foam continue to collapse upon itself. However, once internal buckling stops the foam goes into a densification region as indicated by C. High increases in load are required for increased deflection.

Figure 10:
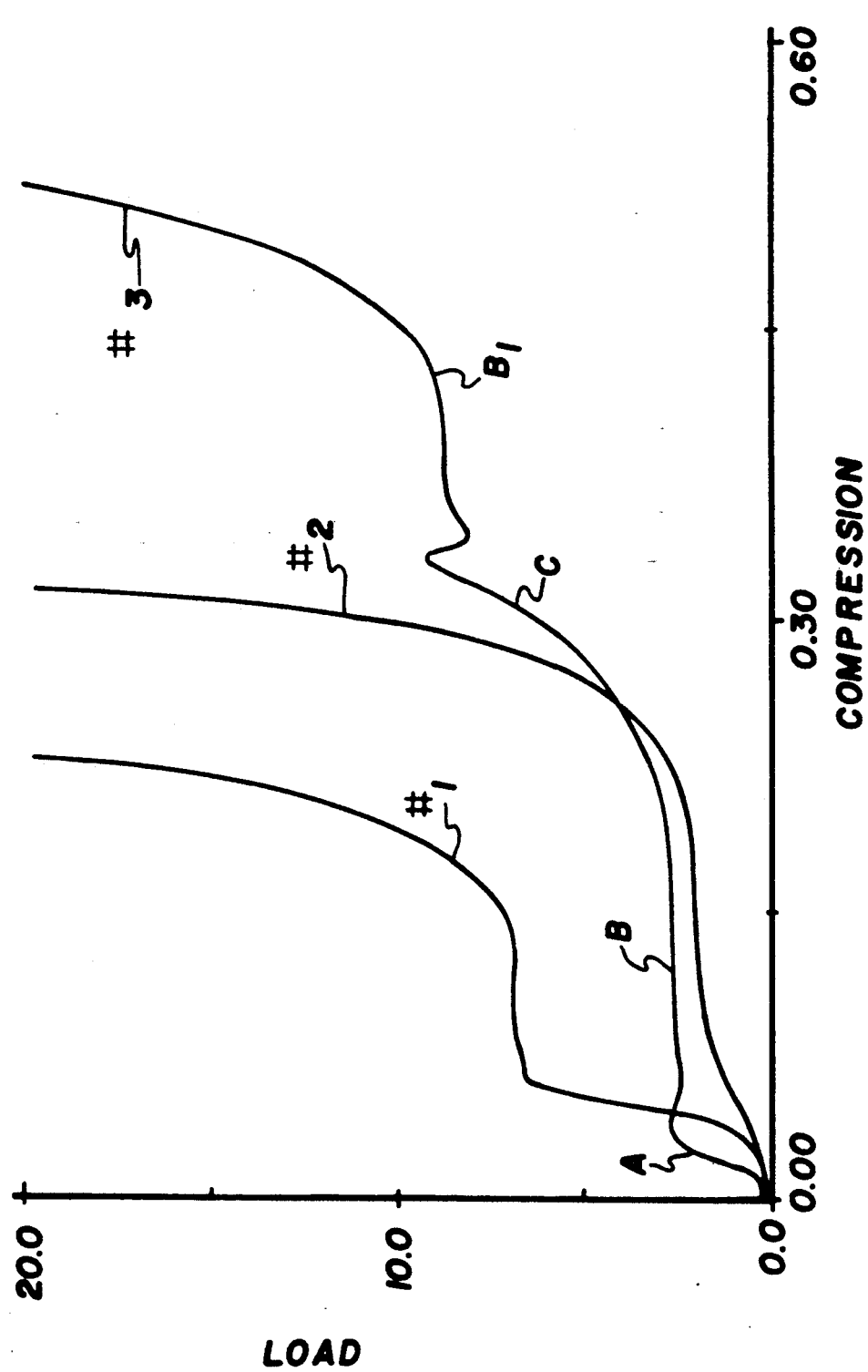
FIG. 10 is a load deflection curve for a composite foam layer made in accordance with the present invention as compared to the load deflection curve for each of the layers that form the composite layer.

Referring to FIG. 10, there is illustrated the load deflection curves for the inner layer 64 by itself (curve #1), outer layer 66 by itself (curve #2) and the composite pad 60 (curve #3). As can be seen, curve #3 for the composite pad produces a curve wherein the buckling section B lasts for a greater deflection and the densification section is substantially reduced such that the elastic buckling section B1 of the outer layer 66 takes over where the inner layer 64 leaves off. The thickness of the inner and outer layers 64,66 and the particular density values for the layers 64,66 are selected so that the maximum deflection that the pad 60 is subjected to will result in the deflection staying within the buckling region of the inner layer. Preferably just below where the linear portion of the outer layer 66 takes over. In the particular embodiment illustrated the maximum deflection the pad 60 experiences when a sheet of film is placed within the cassette is about 0.27 inches (0.6858 cms).

The cassette of the present invention is easily manufactured. The upper and lower portions 12,14 are preferably molded of an appropriate plastic material in the desired configuration as illustrated. Like wise the hinge 16 is also molded from an appropriate plastic material as is commonly done in the prior art. The lower portion 14, upper portion 12 and hinge are then assembled together, for example by an appropriate adhesive, to form the cassette. The inner foam layers 64,66 are cut from an appropriate sheet of foam material. The layers 64,66 are cut to the appropriate size so that fit snugly within the cassette so that the sides of the foam layers 64,66 will be directly adjacent the side wallwalk portions 24,25,26,28. An adhesive coating is applied to one of the layers 64, 66 and the layers are secured together so that the peripheral edges are aligned. The intensifying screen 62 is then adhered to the outer surface of the outer layer 66 by an appropriate adhesive. The assembled foam pad 60 is the secured to the inner surface of the cover 12 by an appropriate adhesive with the openings of the inner layer 64 receiving the latch assemblies.

The present invention provides a cassette that is easy to manufacture and minimizes and/or avoids the problems of the prior art.

It is to be understood that various other changes and modifications may be made without departing from the scope of the present invention. The present invention being defined by the following claims:

I claim:

1. A cassette for a photosensitive element, such as an x-ray film, said cassette comprising:

a first cassette portion having an inner surface;

a second cassette portion secured to said first cassette portion for movement between open and closed positions, said first and second cassette portions forming a light tight space therebetween for receiving a photosensitive element when said cassette is in the closed position;

a cushion pad assembly secured to the inner surface of said first cassette portion, said cushion pad assembly comprising a first inner layer and a second outer layer, said first inner layer being adjacent the inner surface of said first cassette portion, said inner layer being made of a material having a first load deflection value, said second outer layer being superimposed over said first inner layer, said second layer being made of a material having a load deflection value greater than that of said first inner layer.

2. A cassette according to claim 1 wherein said inner layer has a thickness of 0.25 inches (0.635 cms) and a density in the range of about 1 to 1.2 lbs/cubic foot.

3. A cassette according to claim 1 wherein said inner layer has a load deflection curve with a load deflection value in the elastic buckling region of the curve of about 2.0 to 2.5 lbs.

4. A cassette according to claim 1 wherein said outer layer has a load deflection curve with a load deflection value in the elastic buckling region of the curve in the range of about 7.0 to 8.0 lbs.

5. A cassette according to claim 1 wherein said outer layer has a load deflection curve with a load deflection value in the elastic buckling region of the curve of about 7.5 lbs.

6. A cassette according to claim 1 wherein said outer layer has a thickness of 0.375 inches (0.9525 cm) and a density of about 3.0 lbs.

7. A cassette according to claim 1 wherein said cushion pad assembly is dimensioned such that pressure applied across a photographic element placed in said cassette does not vary by more than 20%.

8. An x-ray cassette for holding an x-ray film comprising:

a first cassette portion having a substantially rectangular configuration;

a second cassette portion secured to said first cassette portion for movement between open and closed positions, said first and second portions forming a light tight space therebetween for receiving a photosensitive element when said cassette is in the closed position;

a least one latch assembly for securing said first cassette portion to said second cassette portion;

a cushion pad assembly secured to the inner surface of said first said portion, a cassette cushion assembly comprising a first inner layer and an outer layer secured to the inner layer, said inner layer being secured and being disposed adjacent said inner surface of said first cassette portion and extending between the edges of said first cassette portion, said first layer having a cut-out portion for receiving said at least one latch assembly, said inner layer having a thickness such that the top surface of said inner layer is substantially equal to, or greater than the height of said adjacent latch assembly, said outer layer extending over said inner layer and covering said cut-out portion so as to provide a continuous support surface between said edges of said first cassette portion.

9. A cassette according to claim 8 wherein two latch assemblies are provided.

10. A cassette according to claim 8 wherein said outer layer has a load deflection value greater than that of said inner layer.

11. A cassette according to claim 10 wherein said cushion pad assembly is dimensioned such that pressure applied across a photographic element placed in said cassette does not vary by more than 20%.

12. A cassette according to claim 8 wherein said cushion pad assembly is dimensioned such that pressure applied across a photographic element placed in said cassette does not vary by more than 10%.

13. A cassette according to claim 8 wherein said first inner layer has a thickness of about 0.25 inches (0.635 cms).

14. A cassette according to claim 8 wherein said second outer layer has a thickness of about 0.375 inches 0.9525 cms).

15. An x-ray cassette for holding an x-ray film comprising:
a first cassette portion having a substantially rectangular configuration, said first cassette portion having a pair of side edges, a front edge and rear edge;
a second cassette portion secured to the first cassette portion for movement between open and closed positions, said first and second cassette portions forming a light tight space therebetween for receiving a photosensitive element, said second portion comprising a substantially rectangular bottom panel and a peripheral upstanding wall extending from said bottom panel along the entire periphery, said outer wall comprising a pair of side wall sections, front wall sections and rear wall sections;
a least one latch assembly for securing said first cassette portion to said second cassette portion;
a cushion pad assembly secured to the inner surface of said first cassette portion, said cushion pad assembly comprising a first inner layer, an outer layer secured to the inner layer and an intensifying screen secured to the outer surface of said outer layer for placement against a photosensitive element placed in said space, said inner layer extending between the edges of said first cassette portion and having a cut-out portion for receiving each of said at least one latch assembly, said inner layer having a thickness such that the top surface of said inner layer is substantially equal to, or greater than the height of said adjacent latch assembly, said outer layer extending over said inner layer and covering said cut-out portion so as to provide a continuous support surface between said edges of said first cassette portion, said outer layer having a load deflection value greater than said inner layer.

16. A cassette according to claim 15 wherein said cushion pad assembly is dimensioned such that pressure applied across a photographic element placed in said cassette does not vary by more than 20%.

17. A cassette according to claim 15 wherein said cushion pad assembly is dimensioned such that pressure applied across a photographic element placed in said cassette does not vary by more than 10%.

18. A cassette according to claim 15 wherein said first inner layer has a thickness of about 0.25 inches 0.635 cms).

19. A cassette according to claim 15 wherein said second outer layer has a thickness of about 0.375 inches 0.9525 cms).

20. A cassette for a photographic element, such as an x-ray film, comprising:
a first cassette portion having a pair of side edges, a front edge and rear edge;
a second cassette portion secured to said first cassette portion for movement between open and closed positions, said first and second portions forming a light tight space therebetween for receiving a photosensitive element, said second cassette portion comprising a bottom panel and a peripheral upstanding wall extending around the periphery thereof;
a latch assembly secured to the first cassette portion for securing said first cassette portion to said second cassette portion;
a cushion pad assembly secured to the inner surface of said first cassette portion, said cushion pad assembly comprising a first inner layer, a second outer layer, and an intensifying screen secured to said cushion assembly, said first inner layer being adjacent the inner surface of said first cassette portion and being made of a material having a first load deflection value, said second outer layer being superimposed over said first inner layer so as to substantially extend over and cover the surface area of the first cassette portion, said second layer being made of a material having a load deflection value greater than that of said first inner layer, said intensifying screen being secured to the other side of said outer layer.

21. A cassette according to claim 20 wherein said inner layer has a thickness of 0.25 inches (0.635 cms) and a density in the range of about 1 to 1.2 lbs/cubic foot.

22. A cassette according to claim 20 wherein inner layer has a load deflection curve with a load deflection value in the elastic buckling region of the curve of about 2.0 to 2.5 lbs.

23. A cassette according to claim 20 wherein said outer layer has a load deflection curve with a load deflection value in the elastic buckling region of the curve in the range of about 7.0 to 8.0 lbs.

24. A cassette according to claim 20 wherein said outer layer has a load deflection curve with a load deflection value in the elastic buckling region of the curve of about 7.5 lbs.

25. A cassette according to claim 20 wherein said outer layer has a thickness of 0.375 inches (0.9525 cms) and a density of about 3.0 lbs.

26. A cassette according to claim 20 wherein said cushion pad assembly is dimensioned such that pressure applied across a photographic element placed in said cassette does not vary by more than 20%.

27. A cassette for a photosensitive element, such as an x-ray film, said cassette comprising:
a first cassette portion;
a second cassette portion secured to said first cassette portion for movement between open and closed positions, said first and second cassette portions forming a light tight space therebetween for receiving a photosensitive element when said cassette is in the closed position;
a cusion pad assembly secured to the inner surface of said first cassette portion, said cushion pad assembly comprising a first inner layer and a second outer layer, said first inner layer being adjacent the inner surface of said first cassette portion, said inner layer being made of a material having a first density, said second outer layer being superimposed over said first inner layer, said second layer being made of a material having a density greater than that of said first inner layer.

28. A cassette according to claim 27 wherein said inner layer has a thickness of 0.25 inches (0.635 cms) and a density in the range of about 1 to 1.2 lbs/cubic foot.

29. A cassette according to claim 27 wherein said inner layer is made out of a material having a load deflection curve with a load deflection value in the elastic buckling region of the curve of about 2.0 to 2.5 lbs.

30. A cassette according to claim 27 wherein said outer layer has a load deflection curve with a load deflection value in the elastic buckling region of the curve in the range of about 7.0 to 8.0 lbs.

31. A cassette according to claim 27 wherein said outer layer has a load deflection curve with a load deflection value in the elastic buckling region of the curve of about 7.5 lbs.

32. A cassette according to claim 27 wherein said outer layer has a thickness of 0.375 inches (0.9525 cms) and a density of about 3.0 lbs.

* * * * *